Figure 1:
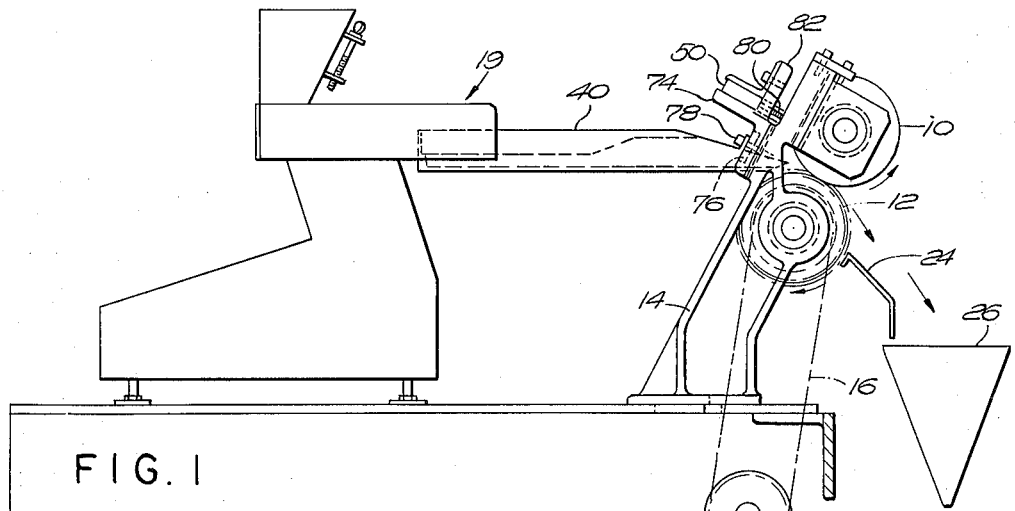

Nov. 16, 1965   J. W. GARDNER   3,217,764
APPARATUS FOR SLITTING NUT SKINS
Filed Jan. 16, 1963   3 Sheets-Sheet 1

INVENTOR.
JAMES W. GARDNER
BY *Morse & Altman*
ATTORNEY

INVENTOR.
JAMES W. GARDNER
BY Morse & Altman
ATTORNEY

Nov. 16, 1965  J. W. GARDNER  3,217,764
APPARATUS FOR SLITTING NUT SKINS
Filed Jan. 16, 1963  3 Sheets-Sheet 3

INVENTOR.
JAMES W. GARDNER
BY
Morse & Altman
ATTORNEY

3,217,764
APPARATUS FOR SLITTING NUT SKINS
James W. Gardner, 309 Washington Ave., Tyrone, Pa.
Filed Jan. 16, 1963, Ser. No. 251,825
5 Claims. (Cl. 146—32)

This invention relates generally to peanut blanching and more particularly is directed towards a new and improved apparatus for slitting the skins of shelled peanuts and the like from one end to the other and along both sides thereof.

According to present practice, nut blanching may be carried out by first slitting the outer skins of the nuts substantially from one end to the other and along both sides. After the skins have been slit in this fashion, they are then loosened by dousing the nuts in a bath of scalding water. This is followed by a rubbing operation in which the skins are removed from the nuts by passing them between a pair of opposing oscillating rubbing surfaces. In my U.S. Patent No. 2,699,806, there is described a nut skin slitting apparatus comprising a pair of counter rotating wheels arranged coplanar to one another and defining a gap therebetween into which is feed a stream of shelled peanuts. Each nut is gripped between the two rolls and its skin is slit from end to end by a pair of knives arranged with their cutting edges on either side of the gap.

While the above described apparatus provides a unique and efficient mechanism for slitting the skins of nuts, it is not readily adapted to accommodate nuts of different sizes. Furthermore, the apparatus is subject to jamming by means of nuts becoming lodged between the cutting blades.

Accordingly, it is an object of the present invention to provide improvements in machines for slitting nut skins.

Another object of this invention is to provide a machine for slitting the skins of nuts which machine is adapted to accommodate nuts of various grades and sizes.

Still another object of this invention is to provide means for preventing the jamming of nuts in a nut skin slitting apparatus.

Yet another object of this invention is to provide a new and improved apparatus for supporting nuts during skin slitting operations.

More particularly, this invention features a machine for slitting the skins of nuts comprising a pair of coplanar rolls mounted on a supporting member and defining a gap between their peripheral edges. According to the invention, the rolls are movable to and away from one another to vary the size of the gap according to the average size of the nuts which are being fed therethrough. As another feature of this invention, the skin slitting elements are disposed on opposite sides of the gap and arranged to be moved into and out of said gap and to and away from either of said rolls to locate the elements at their optimum cutting position. As another feature of this invention, one of these rolls is provided with a peripheral groove of V cross section into which nuts are successively seated and moved into light clamping engagement with the peripheral edge of the other roll.

The second of these rolls is provided with a peripheral cushion which cooperates with the groove of the first roll to hold the nut and pass it between the cutting elements. According to the invention, one of the rolls, preferably the grooved one, is provided with one or more radial shoulders located on the periphery of the roll and adapted to knock free any nuts which may become jammed between the cutting elements thereby insuring a continuous uninterrupted flow of nuts between the rolls and the cutting elements.

Figure 2:
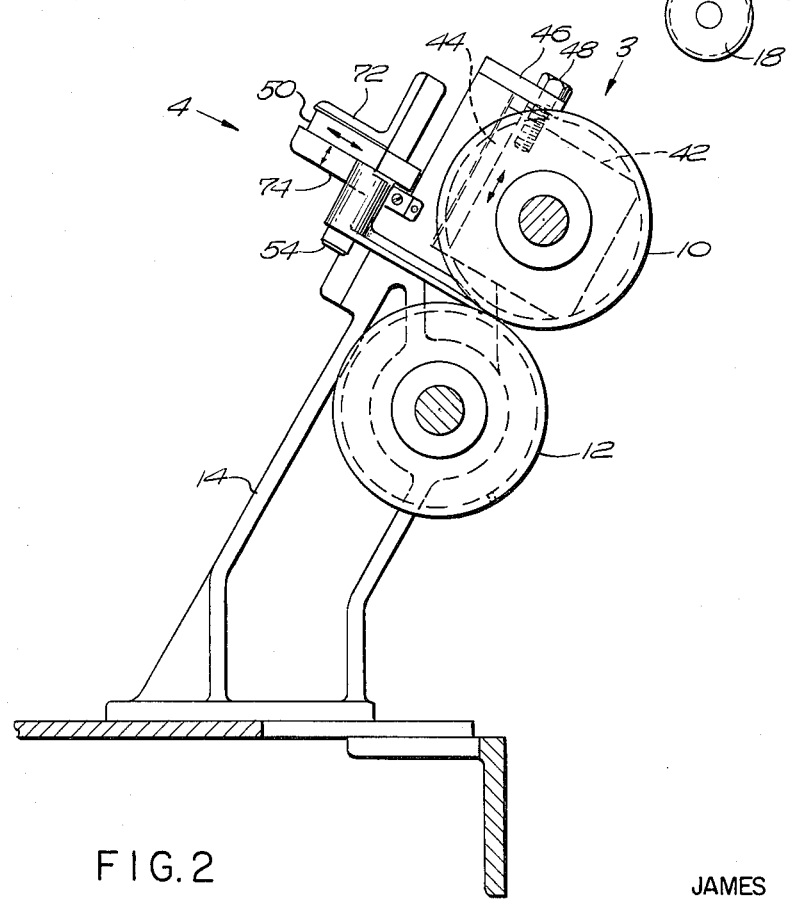
Figure 3:
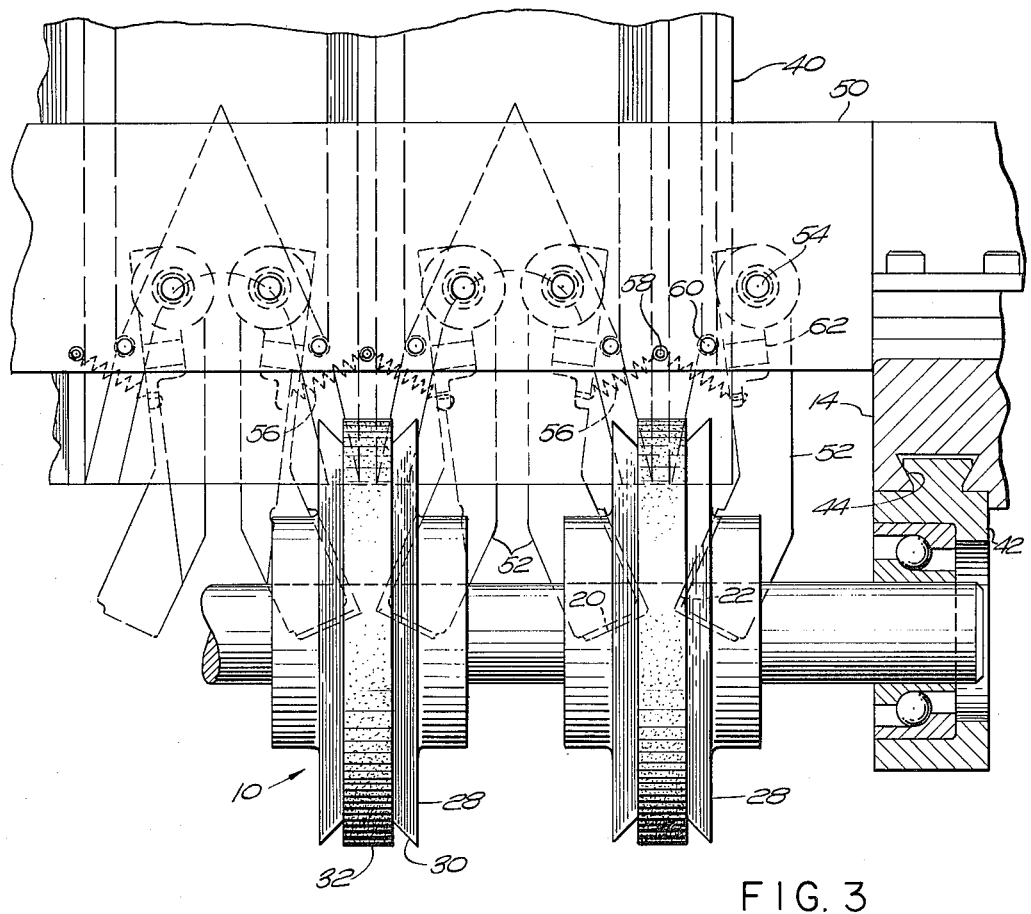
Figure 6:
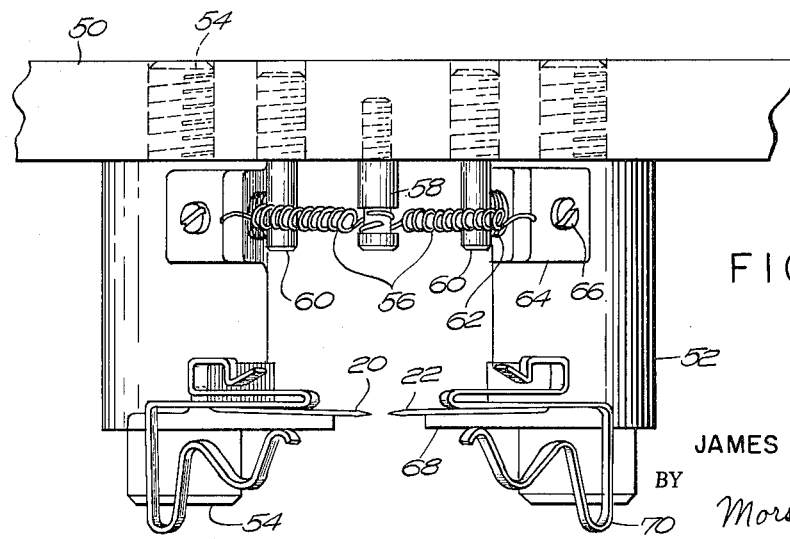
Figure 4:
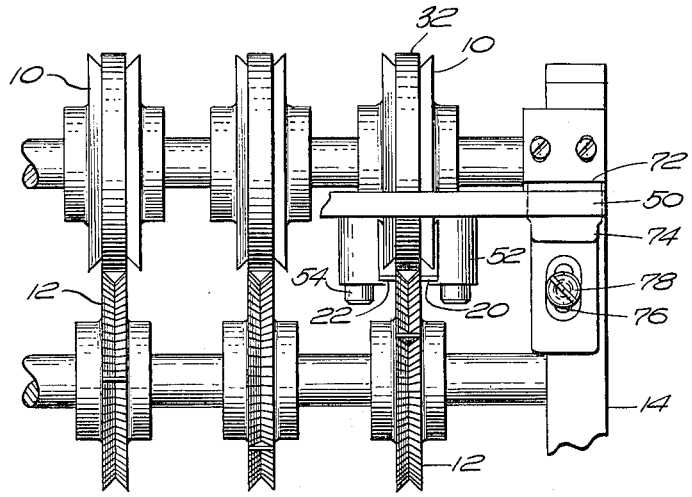
Figure 5:
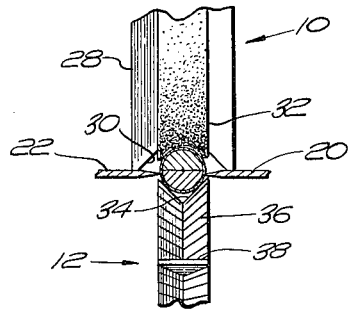

But these and other features of the invention, along with further objects and advantages thereof, will become more readily apparent from the following detailed description of a preferred embodiment thereof, with reference being made to the accompanying drawings in which:

FIG. 1 is a view in side elevation of a nut skinning apparatus made according to the invention, FIG. 2 is a view similar to FIG. 1 but showing the slitting mechanism only and on an enlarged scale, FIG. 3 is a top view of the slitting mechanism taken in the direction of the arrow 3 in FIG. 2, FIG. 4 is a rear elevation of the skin slitting mechanism taken in the direction of the arrow 4 in FIG. 2, FIG. 5 is a detail view similar to FIG. 4 showing a nut being held by the rolls and simultaneously being slit by the cutting elements, and, FIG. 6 is a detail view in front elevation showing the skin slitting elements of FIG. 3.

Referring now to the drawings, the skin slitting apparatus of the invention is generally organized about a pair of rolls 10 and 12, arranged coplanar to one another one above the other and mounted on a support 14 for rotation about horizontal parallel axes. As best shown in FIG. 1 the upper roll 10 is offset slightly forwardly of the lower roll 12 so as to provide space on the top portion of the roll 12 wherein a shelled nut may be seated. Both rolls are geared together by loosely meshed taper sprocket gears (not shown) with the lower gear being drivingly connected by means of a belt 16 to a drive shaft 18 extending below the support 14. The rolls 10 and 12 are arranged for rotation in opposite directions as indicated by the arrows of FIG. 1 so that nuts fed into the bite of the rolls by means of a vibratory feeder, indicated generally by the reference character 19, will be gripped by the peripheral edges of the rolls and passed between a pair of cutting elements 20 and 22 (FIG. 4). As the nut is carried between the cutting elements, its skin will be slit from one end to the other and along both sides thereof. After the nut has passed out of engagement with the slitting elements, it will be discharged down a chute 24 into a hopper 26 which will deliver the nuts to the next blanching operation.

According to the invention, the upper roll 10 comprises a pair of annular metal plates 28 having inwardly beveled edges 30 and sandwiching therebetween a resilient annulus 32 of slightly greater diameter than the plates. In the preferred embodiment of this invention, the annulus 32 is fabricated from sponge rubber or similar resilient material. The lower roll 12 is preferably fabricated from a rigid material such as metal or the like and is of generally the same size as the upper roll 10. However, the lower roll 12 is formed with a V groove 34 about its peripheral edge with a plurality of teeth 36 or other frictional elements formed on the faces of the grooves 34.

Disposed at 180° intervals are a pair of radial shoulders or abutments 38 located on the peripheral edge of the roll 12 and spanning the V groove 34. The function of the abutments 38 is to knock free any nuts which may become lodged between the cutting elements 20 and 22. It will be understood that from time to time, certain nuts, either because of their peculiar size or configuration, may become jammed between the cutting elements and the rolls may not have sufficient purchase on the nuts to pass them entirely through the cutting elements. Since this condition would cause the following nuts to pile up and spill off the feeder if left uncorrected, it is necessary to clear the nut that is caught. Accordingly, the abutments 28 will function to dislodge whatever nuts might become caught and thereby insure continuous and unimpaired operation of the machine.

As shown in FIG. 1 the nuts are normally delivered from the vibratory feeder 19 onto the lower roll 12 by means of a tray 40. As the nuts are delivered to the top surface of the lower roll 12, they are seated in the groove 34 and then carried forwardly to be gripped by the upper roll 10 which is offset forwardly of the lower roll. It will be appreciated that by offsetting the upper roll forwardly of the lower roll the nuts may be properly oriented in a generally longitudinal direction before being gripped for the slitting operation. The V groove together with the peripheral teeth provide an excellent seating arrangement for the nuts and cooperate with the resilient upper roll to hold the nut firmly yet gently in place while carrying it between the cutters. It will be appreciated also that care must be taken not to provide an excessive gripping pressure on the nut since the nut is relatively fragile and splits or disintegrates quite easily.

In order to accommodate nuts of different sizes, the upper roll 10 is adjustably mounted to the support 14. As best shown in FIG. 2 the roll 10 is carried in a bearing block 42 which has its rear face slidably engaged with the upper forward face of the support 14 by means of spline 44. The upper end of the support 14 is provided with an overhanging plate 46 and carries a bolt 48 which passes rotatably through the plate into threaded engagement with bearing block 42. It will be understood that by rotating the bolt 48 one way or another, the bearing block with its roll 10 may be raised or lowered to vary the gap between the roll 10 and the roll 12 as desired.

The cutting elements 20 and 22 are arranged on opposite sides of the rolls 10 and 12 adjacent the gap formed therebetween and are carried by an elongated plate 50 which is mounted on the rear face of the support 14. The cutting elements typically are in the form of sharpened knives or blades mounted opposite one another on the end of a pair of pivoted arms 52. The arms 52 are of L shaped construction with the shorter leg of the L each being pivoted by a pin 54 to the lower surface of the plate 50. The two blade carrying arms 52 are normally urged towards one another by a pair of coil springs 56, each connected to a common post 58 and its respective arm 52. The inward movement of the arms 52 is limited by means of a pair of bosses 60 fashioned on the lower face of the plate 50. Each arm may have the limit of its angular position about the pin 54 adjusted by means of a screw 62 which is threaded through a block portion 64 formed integral with each arm. The screw 62 will be seen in FIG. 6 to have its inner end bearing against the boss 60. It will be readily understood that by appropriate adjustment of the screw 62 the gap between the two cutting elements may be varied as desired. A locking screw 66 is also provided to lock the screw 62 in place. This locking screw is threaded to the block portion 64 perpendicular to the screw 62 as best seen in FIG. 6.

By providing the adjustment means shown in FIG. 6 the gap between the cutting elements may be varied according to the size of the nuts being processed. It will be appreciated that if the blades are too close to one another, an excessively deep cut may be made in the nut causing it to split. On the other hand, if the blades are set too far apart the nut may miss being slit entirely or the slit may be of insufficient length. The cutting blades 20 and 22 are readily replaceable and are mounted to the ends of the arms 52 in recesses 68 formed on the lower portion of each arm. Spring clips 70 are provided for holding each cutter in position. It will be noted that the spring clip is of a unique configuration having its upper end snapped into engagement over a molded rib formed lengthwise of the arm 52 and its lower leg bearing up against the blade 20 holding it in its respective recess 68.

In order to raise or lower the cutting elements with respect to the rolls and to move the elements into or out of the gap defined by the rolls so as to achieve the most efficient and optimum position for slitting the nut skins, the cutter supporting plate 50 is mounted to the support 14 for adjustment along two coordinates.

As shown in FIGS. 1 and 2 the ends of the plate 50 are clamped by an angle piece 72 to an angle bracket 74 which in turn has one leg thereof bolted to the rear face of the support 14. A slot 76 is formed in the lower support-engaging leg of the bracket 74 so that by loosening a bolt 78, the bracket 74, together with the plate and its depending cutting elements, may be raised or lowered in a plane parallel to the rolls 10 and 12. A screw 80 is threaded to a right angular upper leg 82 of the bracket 74 and is adapted to engage the forward edge of the plate 50 for positioning the plate and its cutting elements in a plane normal to the plane of the rolls 10 and 12. In other words, by an appropriate adjustment of the screw 80, the cutting knives may be moved into or out of the gap formed by the rolls as desired. It will be understood that these adjustments may be made at each of the supports 14 located at either end of the plate 50.

It will be appreciated that the apparatus described and illustrated herein is particularly versatile since it can be readily adjusted to accommodate various sizes and types of nuts. The novel lower roll provides improved seating and gripping of each nut and in cooperation with the peripheral abutments effectively prevents nuts from becoming lodged between the cutting elements.

While the invention has been described with particular reference to the illustrated embodiment, it will be understood that numerous modifications thereto will appear to those skilled in the art without departing from the invention. It will also be understood that the foregoing description of the invention along with the accompanying drawings should be taken as illustrative of the invention and not in a limiting sense.

Having thus described my invention, what I claim and desire to obtain by Letters Patent of the United States is:

1. Apparatus for slitting the skins of nuts, including a pair of rolls disposed in a vertical plane one above the other, the upper of said rolls being spaced from the lower of said rolls to define a nut receiving gap between their peripheries, said upper roll being provided with resilient cushioning means about its periphery, said lower roll being fabricated from rigid material and having a groove formed about its periphery, said groove being dimensioned to support nuts placed thereon with substantial portions of opposite sides exposed in said gap to permit said sides to be slit, the walls of said grooves being formed with relatively small teeth for carrying nuts in non-slipping engagement through the bite of said rolls.

2. Apparatus according to claim 1 wherein at least one of said rolls is provided with at least one abutment on its periphery, said abutment being adapted upon rotation of said rolls to dislodge nuts jammed within said gap.

3. Apparatus for slitting the skins of nuts along lines extending substantially from one end to the other of the nuts and along both sides thereof, comprising a pair of counter-rotatable rolls, support means mounting said rolls in spaced coplanar relationship one over the other to define a nut receiving gap between the peripheral edges thereof, the upper of said rolls being offset forwardly of the lower roll, a first adjustable guide connecting said rolls to said support for selectively moving said rolls to or away from one another along a path inclined from the vertical to vary the size of said gap while maintaining the offset relation of said rolls, spaced skin slitting elements resiliently disposed on opposite sides of said gap and adapted to engage with opposite sides of each nut carried through said gap, a second adjustable guide connecting said slitting elements to said support for selectively moving said elements into and out of said gap, a third adjustable guide connecting said slitting elements to said support for selectively moving said elements from one side to the other of said gap parallel to said inclined path and screw adjustment means connecting each of said slitting elements for individually and selectively adjusting the spacing between said elements, resilient cushioning means disposed about the periphery of the upper roll, the lower roll being fabricated from rigid material and having a groove formed about its periphery, said groove being dimensioned to support nuts placed therein with substantial portions of opposite sides exposed in said gap to permit said sides to be slit, the walls of said grooves being of a frictional character for carrying nuts in non-slipping engagement through the bite of said rolls.

4. Apparatus for slitting the skins of nuts along lines extending substantially from one end to the other of the nuts and along both sides thereof, comprising a pair of counter-rotatable rolls, support means mounting said rolls in vertical coplanar relationship to define a nut receiving gap between the peripheral edges thereof, the upper of said rolls being offset forwardly of the lower of said rolls, first means connecting said rolls to said support for selectively moving said rolls to or away from one another along a forwardly inclined path to vary the size of said gap and maintain the offset relation of said rolls, skin slitting elements disposed on opposite sides of said gap and adapted to engage with opposite sides of each nut carried through said gap, second means connecting said slitting elements to said support for selectively moving said elements into and out of said gap, third means connecting said slitting element to said support for selectively moving said elements from one side to the other of said gap, resilient cushioning means disposed about the periphery of the upper of said rolls, the lower of said rolls being of rigid material and formed with a peripheral groove adapted to receive and orient each of said nuts in a generally longitudinal direction prior to carrying said nut into the bite of said rolls, the walls of said grooves being of a frictional character.

5. Apparatus for slitting the skins of nuts along lines extending substantially from one end to the other of the nuts and along both sides thereof, comprising a pair of counter-rotatable rolls, support means mounting said rolls in vertical coplanar relationship to define a nut receiving gap between the peripheral edges thereof, the upper of said rolls being offset forwardly of the lower of said rolls, first means connecting said rolls to said support for selectively moving said rolls to or away from one another along a forwardly inclined path to vary the size of said gap and maintain the offset relationship of said rolls, skin slitting elements disposed on opposite sides of said gap and adapted to engage with opposite sides of each nut carried through said gap, second means connecting said slitting elements to said support for selectively moving said elements into and out of said gap, third means connecting said slitting elements to said support for selectively moving said elements from one side to the other of said gap, at least one of said rolls being provided with at least one abutment on its periphery, said abutment spanning a relatively small portion of said roll and not normally engaging said nuts but adapted upon rotation of said abutmented roll to dislodge nuts jammed between said slitting elements.

References Cited by the Examiner
UNITED STATES PATENTS

| | | | |
|---|---|---|---|
| 2,144,841 | 1/1939 | Glaser | 241—230 X |
| 2,699,806 | 1/1955 | Gardner | 146—32 |
| 2,722,256 | 11/1955 | Hise | 146—99 X |
| 2,858,863 | 11/1958 | Lorenzen | 146—72 |
| 2,953,177 | 9/1960 | Galba | 146—73 |

FOREIGN PATENTS 11,933  1888  Great Britain.

J. SPENCER OVERHOLSER, *Primary Examiner.*